Patented July 29, 1924.

1,503,172

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO THE SOCIETY OF CHEMICAL INDUSTRY IN BASLE, OF BASEL, SWITZERLAND.

INTERMEDIATE PRODUCT AND PROCESS FOR THE MANUFACTURE OF THE SAME.

No Drawing. Application filed October 18, 1923. Serial No. 669,403.

*To all whom it may concern:*

Be it known that we, FRITZ STRAUB, residing at Basel, Switzerland, and HERMANN SCHNEIDER, residing at Riehen, near Basel, Switzerland, both citizens of the Swiss Republic, have invented a new and useful Intermediate Product and Process for the Manufacture of the same, of which the following is a full, clear, and exact specification.

ing is a full, clear, and exact specification.

This invention relates to the manufacture of a new intermediate product, the 1-oxynaphthalene-8-sulfamide, which is very valuable for the production of dyestuffs. The invention comprises the new product itself, as well as the manufacturing process of same.

It has been found that by the action of ammonia on 1.8-naphthsultone, a new compound is obtained, the 1-oxynaphthalene-8-sulfamide, which, due to its solubility in alkalies and acids, may be separated from the reaction mixture. Under the term ammonia there is understood ammonia gas as well as agents yielding ammonia.

The 1-oxynaphthalene-8-sulfamide forms a nearly colorless powder which in contrast with 1.8-naphthsultone is easily soluble in dilute caustic soda lye and in concentrated aqueous ammonia, and in contrast with 1-oxynaphthalene-8-sulfonic acid is precipitated from such solutions by action of dilute acid. It is somewhat sparingly soluble in organic solvents like acetone, ethyl alcohol, and methyl alcohol. It melts when crystallized from the last-named solvent at 222° C. with decomposition. The 1-oxynaphthalene-8-sulfamide is a valuable starting material for the manufacture of dyestuffs.

*Example 1.*

103 parts of naphthsultone are suspended in 10 parts of water and treated in a closed vessel with gaseous ammonia until the product of reaction has become completely or nearly completely soluble in cold dilute caustic soda solution. The product thus obtained is purified by dissolving in caustic alkali and precipitation by dilute acid. It is the 1-oxynaphthalene-8-sulfamide and is obtained in a yield of over 90 per cent.

*Example 2.*

103 parts of 1.8-naphthsultone are stirred together with 200 parts of concentrated aqueous ammonia until a sample dissolves completely in cold dilute caustic soda solution.

By addition of 700 parts of water the 1-oxynaphthalene-8-sulfamide formed nearly quantitatively, is precipitated.

*Example 3.*

103 parts of naphthsultone are heated to 60–80° C. while stirring with 60 parts of ammonium carbonate in 400 parts of water for several hours until a sample is soluble in dilute caustic soda solution. The whole is then mixed with an excess of caustic soda solution, filtered from some unaltered sultone and acidified to throw out the sulfamide.

What we claim is:

1. The herein described process for the manufacture of a new intermediate product, the 1-oxynaphthalene-8-sulfamide, consisting in causing ammonia to react on 1.8-naphthsultone, and then separating the 1-oxynaphthalene-8-sulfamide from the reaction mixture due to its solubility in alkalies and acids.

2. The herein described process for the manufacture of 1-oxynaphthalene-8-sulfamide, consisting in causing ammonia in a concentrated form to react on 1.8-naphthsultone, and then separating the 1-oxynaphthalene-8-sulfamide from the reaction mixture due to its solubility in alkalies and acids.

3. The herein described process for the manufacture of 1-oxynaphthalene-8-sulfamide, consisting in causing ammonia in a concentrated form to react for a long time on 1.8-naphthsultone, avoiding higher temperatures, and then separating the 1-oxynaphthalene-8-sulfamide from the reaction mixture due to its solubility in alkalies and acids.

4. As a new product the herein described new intermediate product, the 1-oxynaphthalene-8-sulfamide, forming a nearly colorless powder which in contrast with 1.8- naphthsultone is easily soluble in dilute caustic soda solution and in concentrated aqueous ammonia, which is precipitated from such solutions by action of dilute acid, and which is somewhat sparingly soluble in organic solvents like acetone, ethyl alcohol, and methyl alcohol, melting, when crystallized from the last-named solvents, at 222° C. with decomposition.

In witness whereof we have hereunto signed our names this 8th day of October, 1923, in the presence of two subscribing witnesses.

FRITZ STRAUB.
HERMANN SCHNEIDER.

Witnesses:
AMAND BRAUN,
LUCIEN RICARD.